United States Patent [19]
Gillespie

[11] Patent Number: 5,898,858
[45] Date of Patent: Apr. 27, 1999

[54] METHOD AND APPARATUS FOR PROVIDING EMULATOR OVERLAY MEMORY SUPPORT FOR BALL GRID ARRAY MICROPROCESSOR PACKAGES

[75] Inventor: Byron Gillespie, Phoenix, Ariz.

[73] Assignee: Intel Corporation, Santa Clara, Calif.

[21] Appl. No.: 08/535,626

[22] Filed: Sep. 28, 1995

[51] Int. Cl.[6] .................................................. G06F 9/455
[52] U.S. Cl. ........................................................ 395/500
[58] Field of Search .............................. 395/500, 183.04, 395/183.21; 364/200, 232.3, 488, 489

[56] References Cited

U.S. PATENT DOCUMENTS

| | | | |
|---|---|---|---|
| 4,486,827 | 12/1984 | Shima et al. | 364/200 |
| 4,761,733 | 8/1988 | McCrocklin et al. | 364/200 |
| 4,873,705 | 10/1989 | Johnson | 371/21.2 |
| 5,088,033 | 2/1992 | Binkley et al. | 395/500 |
| 5,228,039 | 7/1993 | Knoke et al. | 395/183.04 |
| 5,321,828 | 6/1994 | Phillips et al. | 395/500 |
| 5,329,471 | 7/1994 | Swoboda et al. | 364/578 |
| 5,418,471 | 5/1995 | Kardos | 324/758 |
| 5,535,331 | 7/1996 | Swoboda et al. | 395/183.04 |
| 5,581,695 | 12/1996 | Knocke et al. | 395/183.04 |
| 5,603,619 | 2/1997 | Turner et al. | 439/69 |
| 5,621,651 | 4/1997 | Swoboda et al. | 364/489 |
| 5,630,102 | 5/1997 | Johnson et al. | 395/500 |
| 5,640,048 | 6/1997 | Selna | 257/738 |
| 5,642,262 | 6/1997 | Terrill et al. | 361/783 |

OTHER PUBLICATIONS

"1960 Cx Microprocessor User's Manual", Intel Corp., 1994.

*Primary Examiner*—Kevin J. Teska
*Assistant Examiner*—Matthew Loppnow
*Attorney, Agent, or Firm*—Blakely, Sokoloff, Taylor & Zafman

[57] ABSTRACT

A method and apparatus for providing overlay memory support for ball grid array (BGA) microprocessor packages. A emulator having an overlay memory and an emulator probe is provided. The emulator is connected via the emulator probe to a target printed circuit board (e.g., adapter card). This target board includes a local processor, a local memory, a memory controller, and a local processor bus that couples them together. The local processor, local processor bus, and memory controller are integrated into a BGA chip package. Typically, the local processor executes software programs stored in the local memory. Upon receipt of a first signal, the memory controller disables the local memory and allows the emulator to drive data from the overlay memory onto the local processor bus so that the local processor may execute software programs included in the overlay memory.

14 Claims, 9 Drawing Sheets

METHOD AND APPARATUS FOR PROVIDING EMULATOR OVERLAY MEMORY SUPPORT FOR BALL GRID ARRAY MICROPROCESSOR PACKAGES

BACKGROUND OF THE INVENTION (1) Field of the Invention

The present invention relates generally to computer systems and, in particular to computer systems employing emulator overlay memory support.

(2) Description of the Related Art

Figure 1A:
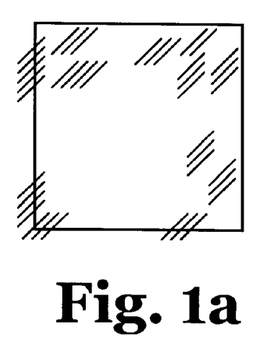
FIG. 1A illustrates a bottom view of a Pin Grid Array (PGA) chip package.
Figure 1B:
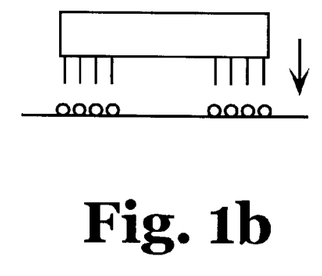
FIG. 1B illustrates a side elevational view of the PGA chip package and how it is coupled to a printed circuit board.

Emulators add value to a corresponding computer system by 1) giving a system designer the ability to test computer components on a printed circuit board (e.g., baseboard or a computer card), and 2) giving an application programmer the ability to modify software in a Read Only Memory (ROM) based system without having to re-program the ROM for every software modification (i.e., providing overlay memory support). Overlay memory support is easily achievable when the microprocessor package technology is a pin grid array (PGA) type, which is illustrated in FIG. 1A (bottom view) and FIG. 1B (side view). The emulator is connected to the computer system via an emulator probe. One simply removes the PGA component from a socket, which is coupled to a target printed circuit board (PCB), and inserts the emulator probe into this socket. The emulator probe includes a special version of the microprocessor that is within the PGA component. This emulator microprocessor includes logic and special signals dedicated for use by the emulator in testing and debugging a target PCB.

In addition, the emulator selectively uses the emulator probe to sever the connection of a target memory to a processor on the target board. By breaking the connection between the target memory and the local processor, the emulator can monitor the instruction fetch (e.g., addresses) addresses and allow either the target memory to provide the necessary data or the emulator over memory to provide the data instructions and addresses for the local processor to execute. The emulator overlay memory allows the emulator to provide data to the processor, regardless of the actual data included in the target memory.

One of the disadvantages of the PGA package technology is the cost associated with the packaging. Since the PGA package technology uses ceramic materials for the package, PGA technology is more expensive than other technologies (e.g., using plastic for the packaging). Accordingly, although the PGA packaging technology may be employed to provide for a high pin count (i.e., it may be adapted to accommodate applications requiring a high number of signal pins), the high costs associated with using ceramic materials becomes prohibitively high, especially when the area of the package is large.

Figure 1C:
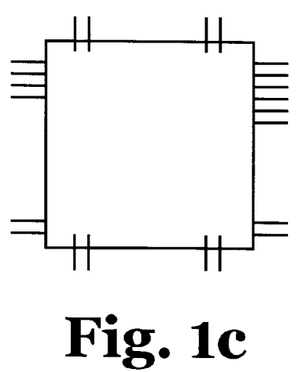
FIG. 1C illustrates a plan view of a Plastic Quad Flat Pack (PQFP) chip package.
Figure 1D:
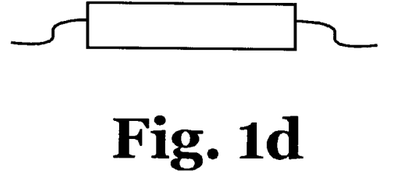
FIG. 1D illustrates a side elevational view of the PQFP chip package.
Figure 1E:
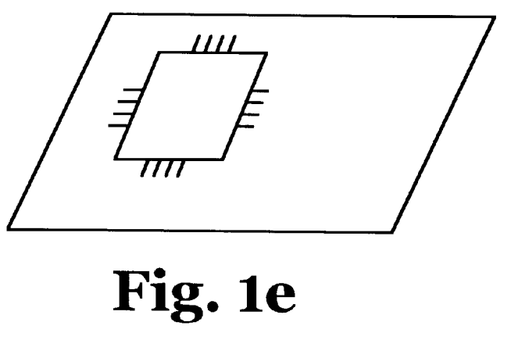
FIG. 1E illustrates how a PQFP chip package is coupled to a printed circuit board.
Figure 1F:
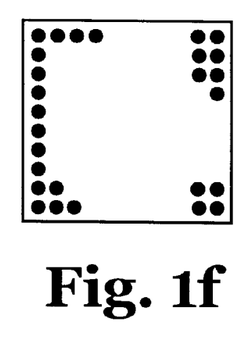
FIG. 1F illustrates a bottom elevational view of a Ball Grid Array (BGA) chip package.

Many chip manufacturers have migrated to a plastic-based packaging technology (e.g., plastic quad flat pack (PQFP) package). Although the PQFP technology is much more cost effective than the PGA type packages, this plastic technology has its own disadvantages. One of the disadvantages of the PQFP package is that it offers a smaller number of signal pins than a similarly sized PGA package. As can be seen in FIG. 1C and FIG. 1E, the PQFP technology only provides signal pins along the perimeter of the package. Another disadvantage of the PQFP technology is that the pins in the package are fragile and can easily be broken. FIG. 1D illustrates a side view of a PQFP packaged chip. Furthermore, when one attempts to increase the number of signal pins, the space between the pins correspondingly decreases, thereby increasing the probability of two adjacent pins contacting and causing signal corruption.

Figure 1G:
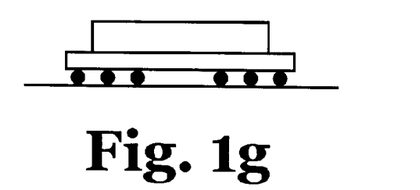
FIG. 1G illustrates a side elevational view of the BGA chip package and how it is coupled to a printed circuit board.

As a result of the above-noted disadvantages of the PQFP technology, chip manufacturers who require a high pin count and desire a plastic package have turned to ball grid array technology. A ball grid array (BGA) package provides a high signal pin count while maintaining a lower cost because the BGA packages are made from a plastic material. Since a BGA package is connected directly to the target board via solder (see FIG. 1G), the solution for providing memory support for PGA type packages is inoperable for the BGA packages (i.e., one cannot simply remove the BGA package from the target board).

One proposed solution to the foregoing problem is to provide a two step process. First, a circuit designer designs a board around a PGA microprocessor package for product development. During this stage the prior art emulators are used for debugging the initial hardware and software applications. Second, once the hardware and software development is completed, the circuit designer re-manufactures the board using a plastic quad flat pack (PQFP) package for production.

Accordingly, during the production phase, the emulator is of no value and cannot be used to locate production problems on the board, once the PQFP packages are used because of the incompatibility of the two different packages (i.e., the signal pins are arranged differently). Another disadvantage is that the chip manufacture is required to re-design the product for every different processor package. Furthermore, the emulator cannot be used for production de-bugging when a target memory on a production board is not functioning. Also, additional circuitry is required to download code to the computer system to locate the failure in these cases.

Accordingly, it would be desirable to provide a method and apparatus for providing emulator overlay memory support for BGA microprocessor packages without the overhead and limitations of the prior art solutions.

Another problem with the prior art solution is that overlay memory support was not available to a processor package that included a memory controller (i.e., the memory controller is not integrated into the same BGA package). Thus, it would be desirable to provide a method and apparatus for providing emulator overlay memory support to a BGA package having both an integrated processor and memory controller. Other aspects of the invention are drawn to such an improved method and apparatus.

SUMMARY OF THE INVENTION

In accordance with one aspect of the invention, a method and apparatus for providing emulator overlay memory support for ball grid array (BGA) microprocessor packages is provided. The emulator provides an input signal to the BGA processor package to notify the processor of an address hit from the emulator (i.e., when an address in the emulator address space is detected). The emulator provides this input signal into an integrated memory controller that is integrated into the BGA microprocessor package. In response to this signal, the memory controller disables the output drivers on local memory that is coupled to a local processor through a local processor bus. The emulator then drives data onto the local processor bus. The local processor then executes the software in the emulator overlay memory.

In an exemplary implementation, the BGA microprocessor package on a target printed circuit board (PCB) is the Intel 80960 RP chip. This chip includes the Intel 80960 JF processor, an integrated memory controller, and an integrated local processor bus (i.e., Intel 80960 processor bus). The memory controller receives an overlay memory enable signal (OVMEM#) from the emulator and in response re-programs an internal wait state generator to generate a RDYRCVINT# to the processor in response to a value provided by the emulator. This value is specific to the type of overlay memory employed and is proportional to the access time of the memory. The OVMEM# signal serves to 1) notify the memory controller that the emulator is connected to the Intel 80960 RP processor with the overlay memory enabled and 2) to notify the memory controller that an overlay memory address hit has occurred.

The specific steps relating to the internal wait state generator are as follows. First, in response to OVMEM# signal, the internal wait state generator is disabled. Second, the emulator asserts an external ready to receive enable signal (RDYRCV_OV#), which is reflective of the overlay memory access time. This signal indicates the time necessary before valid data is ready to be transferred from the overlay memory in the emulator to the local processor.

Thus, the present invention provides a method and apparatus for interfacing an emulator to a target board having an integrated processor and memory controller chip in a BCA package. The present invention also enables the emulator to be connected to the BGA microprocessor package without the emulator probe, used in the prior art. Furthermore, the present invention greatly reduces the overhead costs and shortens the production cycle time by eliminating the need to re-design a product for every different processor package.

Another advantage of the present invention is that the emulator can be used for production de-bugging when a target memory on a board is not functional. The present invention, having pre-defined connector definitions, can replace a target memory and be used to download software, which locates failures in the BGA microprocessor package.

Hence, the present invention provides a method and apparatus for providing emulator overlay memory support for BGA microprocessor packages and for overcoming the disadvantages with the prior art systems, as set forth above. Other features and advantages of the invention will be apparent in the detailed description below in connection with the attached drawings.

DETAILED DESCRIPTION OF THE INVENTION

Referring to the figures, exemplary embodiments of the invention will now be described. The exemplary embodiments are provided to illustrate the aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 2:
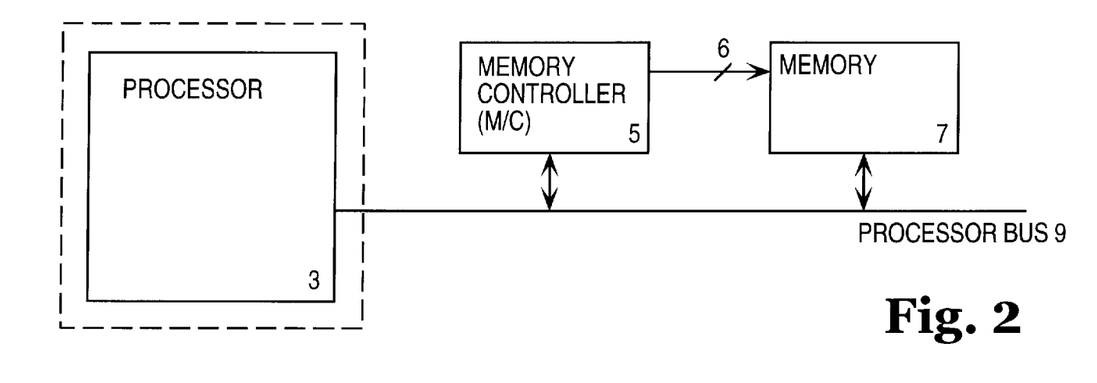
FIG. 2 illustrates a block diagram of a prior art computer system that is not coupled to an emulator.

FIG. 2 illustrates a typical computer system when it is not connected to an emulator. This computer system includes a processor 3 for executing program instructions and a memory controller 5 for controlling access to a memory 7 through a plurality of control signals 6. A processor bus 9 couples the processor 3 with the memory controller 5 and the memory 7.

Figure 3:
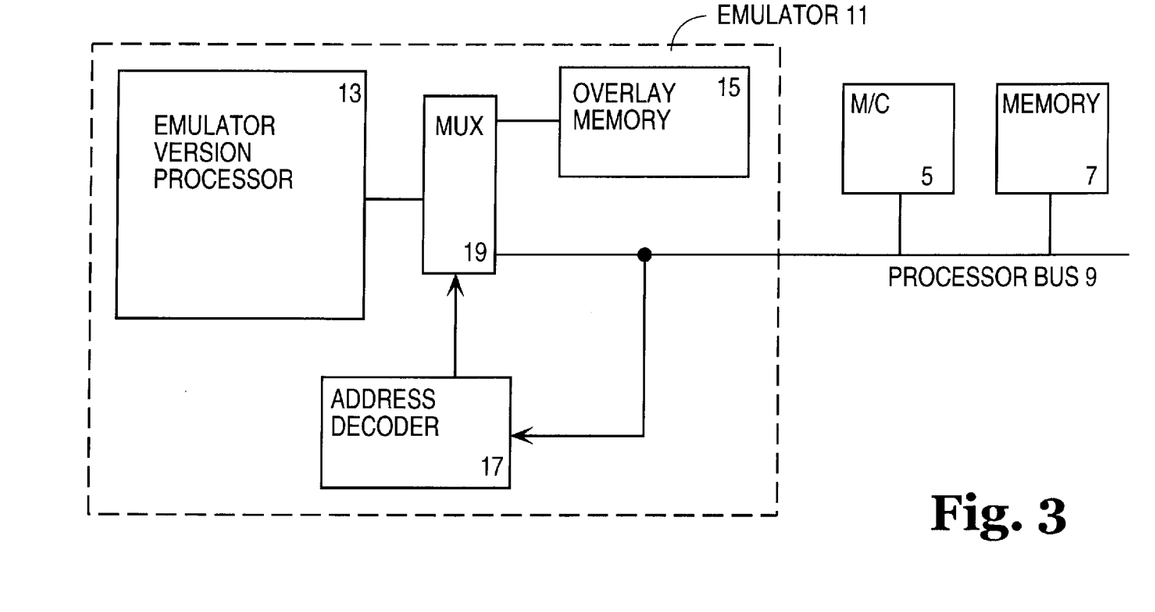
FIG. 3 illustrates a block diagram of a prior art computer system that is coupled to an emulator.

FIG. 3 illustrates a computer system that is coupled to a emulator 11. The emulator 11 includes a special version of the processor 3 of FIG. 2. This special processor 13 includes additional signals and registers, used exclusively for software debugging purposes. The emulator 11 further includes an overlay memory 15 that stores program instructions (e.g., software programs used to debug other application programs). The emulator 11 further includes an address decoder 17 that detects addresses on the processor bus 9 and decodes these addresses. The address decoder 17 is coupled to and controls a multiplexer (MUX) 19. This multiplexer 19 is coupled to the special processor 13, the overlay memory 15 and the processor bus 9. When the computer system is not coupled to an emulator 11, the processor 3 executes program instructions provided by the memory 7.

Referring to FIG. 3, when an address is a normal address (i.e., an address associated with the memory 7), the address decoder 17 selectively provides the special processor 13 with program instructions and data from memory 7. However, if an address is an overlay memory address, address decoder 17 controls the MUX 19 and selectively provides the special processor 13 with program instructions and data from the overlay memory 15.

Figure 4:
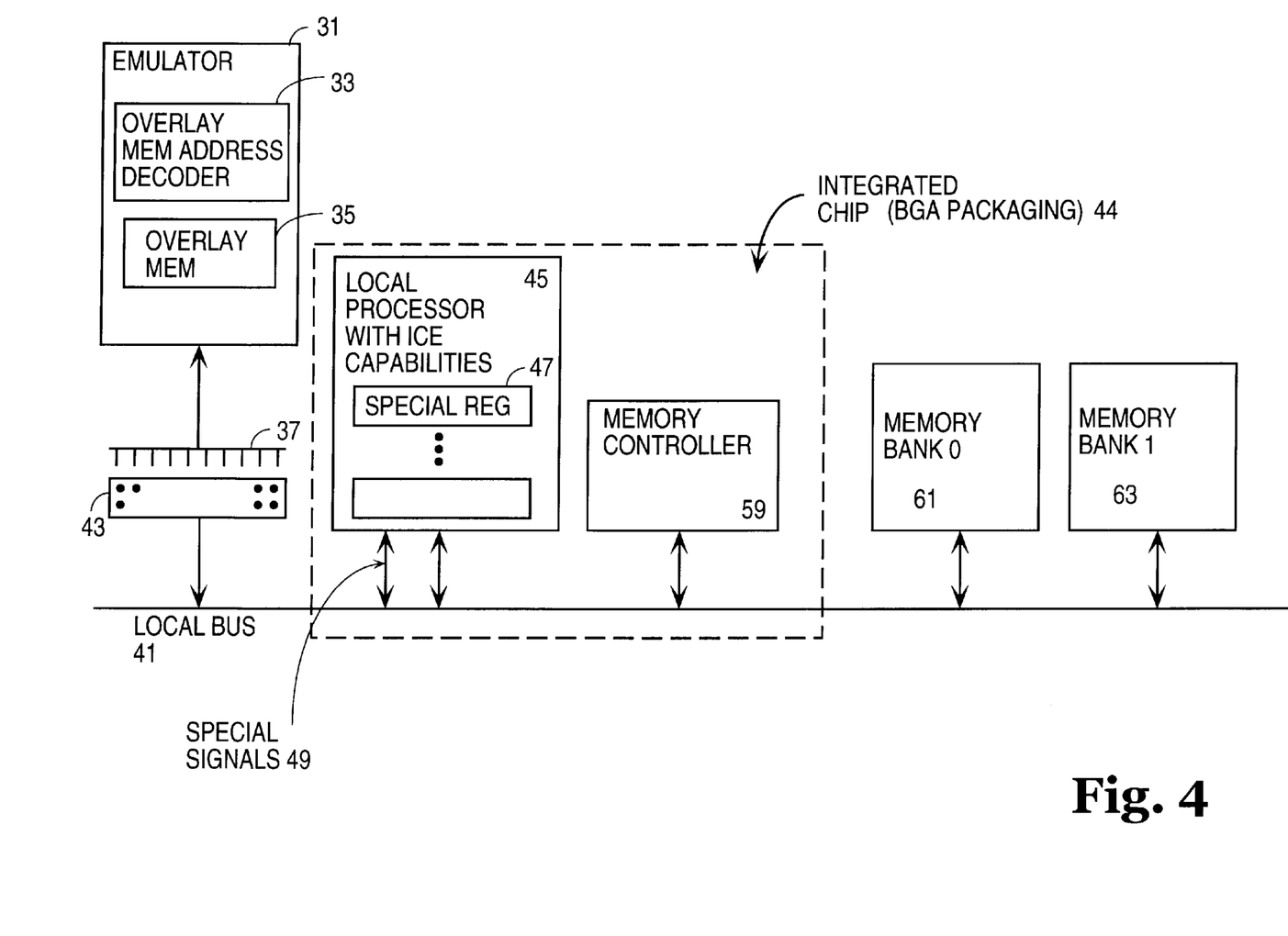
FIG. 4 illustrates a block diagram of a computer system in which the present invention may be implemented.

FIG. 4 illustrates a block diagram of a computer system in which the present invention may be implemented. This computer system includes an emulator 31 that includes an overlay memory address decoder 33 and an overlay memory 35. The overlay memory 35, as noted previously, stores software programs (e.g., software debugging programs) and data. The overlay memory address decoder 33 controls access to the overlay memory 35. The emulator 31 also includes a probe 37 that may be coupled to a local processor bus 41 via a connector 43. This probe 37 is more streamlined than prior art probes in that it does not need a bond-out version of the processor. In fact, the probe is essentially a plurality of data conductors conforming to a connector definition described hereinafter. This connector 43 may be implemented with an elastomeric style connector (e.g., an elastomeric connector pad) having a predefined header for receiving the emulator probe 37. Through the connector 43, data, address, and control signals are passed between the emulator 31 and the local processor bus 41. In a preferred embodiment the connector 43 has the signal definitions illustrated in Appendix A.

The computer system of FIG. 4 also includes an integrated chip 44 having a processor and a memory controller. In a preferred embodiment, this integrated chip 44 is packaged in a BGA package. This integrated chip 44 includes a local processor 45 that has In-Circuit Emulation (ICE) capabilities. This local processor 45 includes special registers 47 and special signals 49 that are particularly useful in debugging software applicationsthat are being developed. For example, the local processor may be an Intel 80960 JF processor.

A memory controller 59 for controlling access to memory bank0 61 and memory bank1 63 is also integrated into the intelligent I/O processor 44. Additional details concerning the memory controller 59 will be described hereinafter. Although two banks of memory are shown in FIG. 4 (61 and 63), it will be evident to one skilled in the art that a computer system may be configured with any number of memory banks. Moreover, these memory banks may be implemented using a variety of different technologies (e.g., DRAMs, ROMs, ROMs, FLASH memories). The local memory 61, 63 is typically Dynamic Random Access Memory (DRAMs) which may be in single in-line memory module (i.e., SIMM) packages and a Read Only Memory (ROM) for storing an instruction set for the associated local processor 45.

Figure 5:
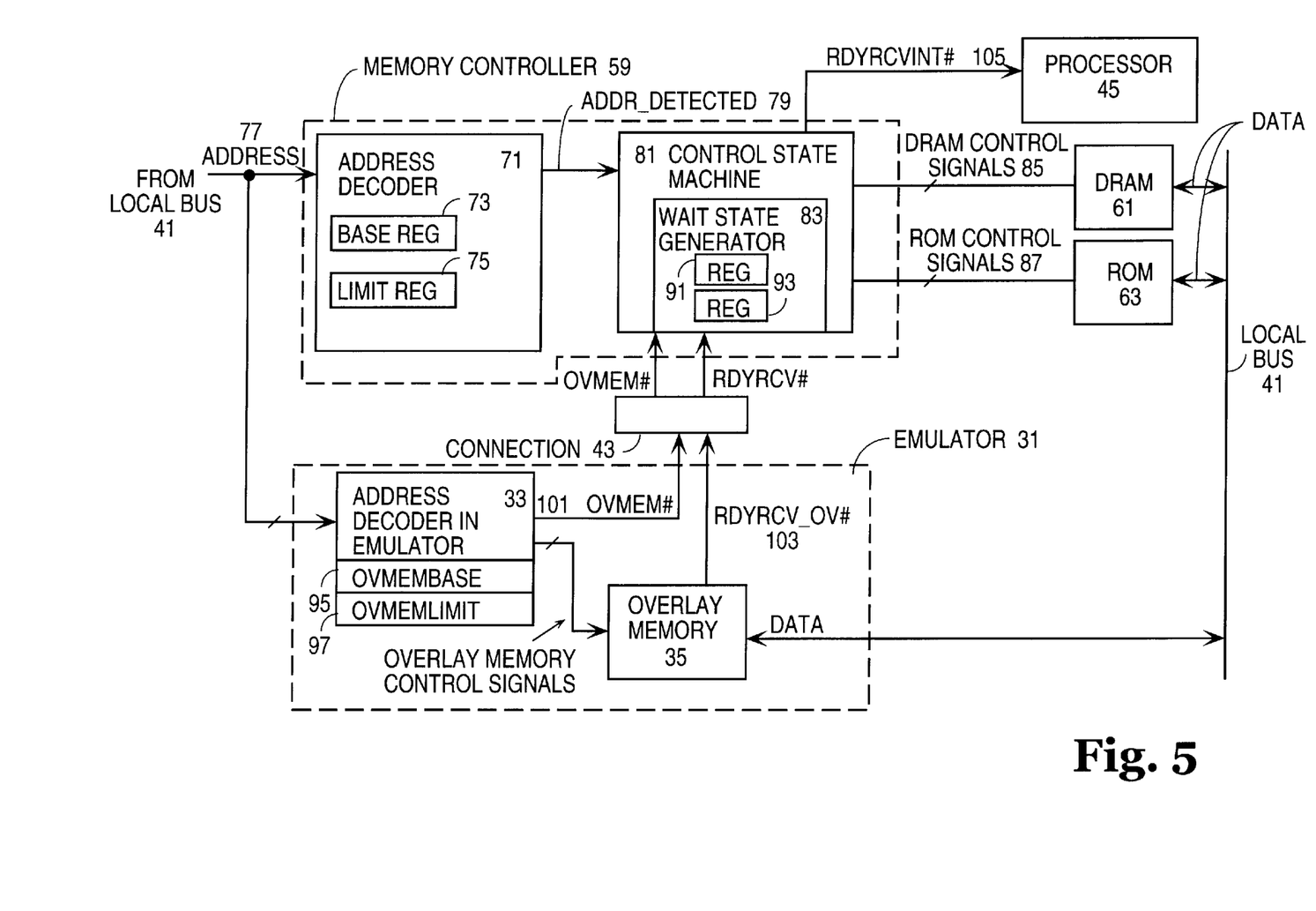
FIG. 5 is a block diagram illustrating the components of the present invention.

FIG. 5 illustrates a block diagram showing the components of the present invention. The memory controller 59 further includes an address decoder 71, which includes a base register 73 for storing a base address and a limit register 75 for storing a limit address. The address decoder 71 is provided addresses 77 from the local bus 41. If the address is within the address, as defined by the base address, stored in the base register 73, and the limit address, stored in the limit register 75, the address decoder 71 generates an ADDR_DETECTED signal 79. This signal 79 indicates that a particular address is within the range delineated by the base address and the limit address.

The memory controller 59 also includes a control state machine 81, which includes a wait state generator 83. The control state machine 81 is provided with the ADDR_DETECTED signal 79. This signal 79 indicates that the address is in memory bank0, memory bank1, or not in either memory bank0 or memory bank1. The control state machine 81 controls the memory bank associated with the desired address to perform the memory operation (i.e., a memory read or memory write). For example, if signal 79 indicates that the address is in the DRAM, the control state machine 81 generates a plurality of DRAM control signals 85 to control data transferred between the DRAM 61 and the local bus 41. Similarly, if the address is in the ROM 63, the control state machine 81 generates a plurality of ROM control signals 87 to control the data transfer between the ROM 63 and the local bus 41. These control signals 85 and 87 are generated only when the overlay memory is disabled.

The control state machine 81 includes a DRAM Wait State Register 91 and a ROM Wait State Register 93. Both of these registers are accessible to software and may be selectively programmed with a value that is indicative of the number of wait states needed before valid data is provided by the particular memory. For example, the value stored in the DRAM Wait State Register 91 indicates to the wait state generator 83 the memory access time associated with the DRAM 61. Similarly, the ROM Wait State Register 93 stores a value that indicates to the wait state generator 83 the access time for the ROM 63. The memory access time is simply the latency between the time when the address is provided to the memory from control state machine 81 and the time when the data is actually provided by the memory to the local bus 41.

The emulator 31, as noted previously, includes an address decoder 33. This address decoder 33 includes an OVMEM-BASE register 95 for storing the overlay memory base address and an OVMEMLIMIT register 97 for storing the overlay memory limit address. The address decoder 33 is provided the addresses 77 from the local bus 41. If an address is within the addresses specified by the overlay memory base address and the overlay memory limit address, the address decoder 33 asserts an OVMEM# signal 101. This signal 101 OVMEM# is provided to the control state machine 81 in the memory controller 59 through a connector 43. The address decoder 33 also controls data transfer between the overlay memory 35 and the local bus 41 through the connector 43.

Figure 6:
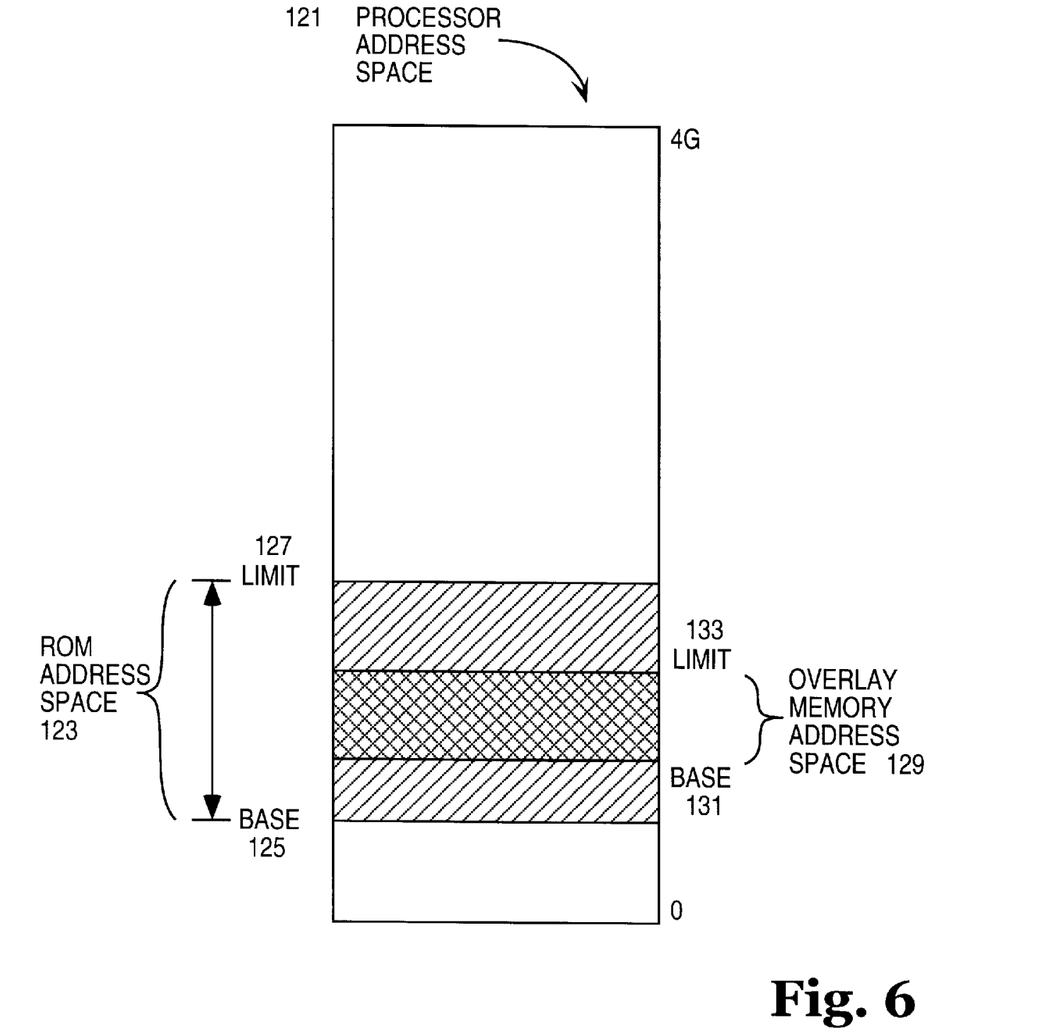
FIG. 6 illustrates a memory map of a processor address space that includes an overlay memory address space.

FIG. 6 illustrates a processor address space 121. This processor address space includes a first memory bank (e.g., a ROM) address space. This ROM address space 123 is specified by a ROM base address 125 and a ROM limit address 127. FIG. 6 also illustrates an overlay memory address space 129 that is defined by an overlay memory base address 131 and an overlay memory limit address 133. Although FIG. 6 illustrates that the overlay memory address space is a subset of the ROM address space, this need not be the case (i.e., the overlay memory address space and the ROM address space may be non-overlapping and reside in different parts of the processor address space 121. Moreover, a computer system may be configured to have any number of memory banks, each having a predefined address space within the processor address space 121.

The overlay memory 35 of FIG. 5 provides the RDYRCV_OV signal 103 to the control state machine 81 through connector 43. This signal 103 notifies the wait state generator 83 of the access time of the overlay memory 35.

Depending on which memory is selected and enabled, (i.e., which memory is providing data to the processor 45), the corresponding RDYRCV# signal determines when the RDYRCVINT# signal 105 is generated by the control state machine 81 and provided to processor 45. The RDYRCVINT# signal 105 is asserted to indicate that data is valid for sampling by the processor 45. As mentioned previously, the generation of RDYRCVINT# signal 105 is controlled by the internal wait state generator 83, which is selectively programmed by the RDYRCV# signal from the corresponding enabled memory. A BLAST# signal is provided by the processor 45 to indicate the last data transfer in a bus access. The BLAST# signal remains active as long as wait states are indicated by the RDYRCVINT# signal 105.

Figure 7:
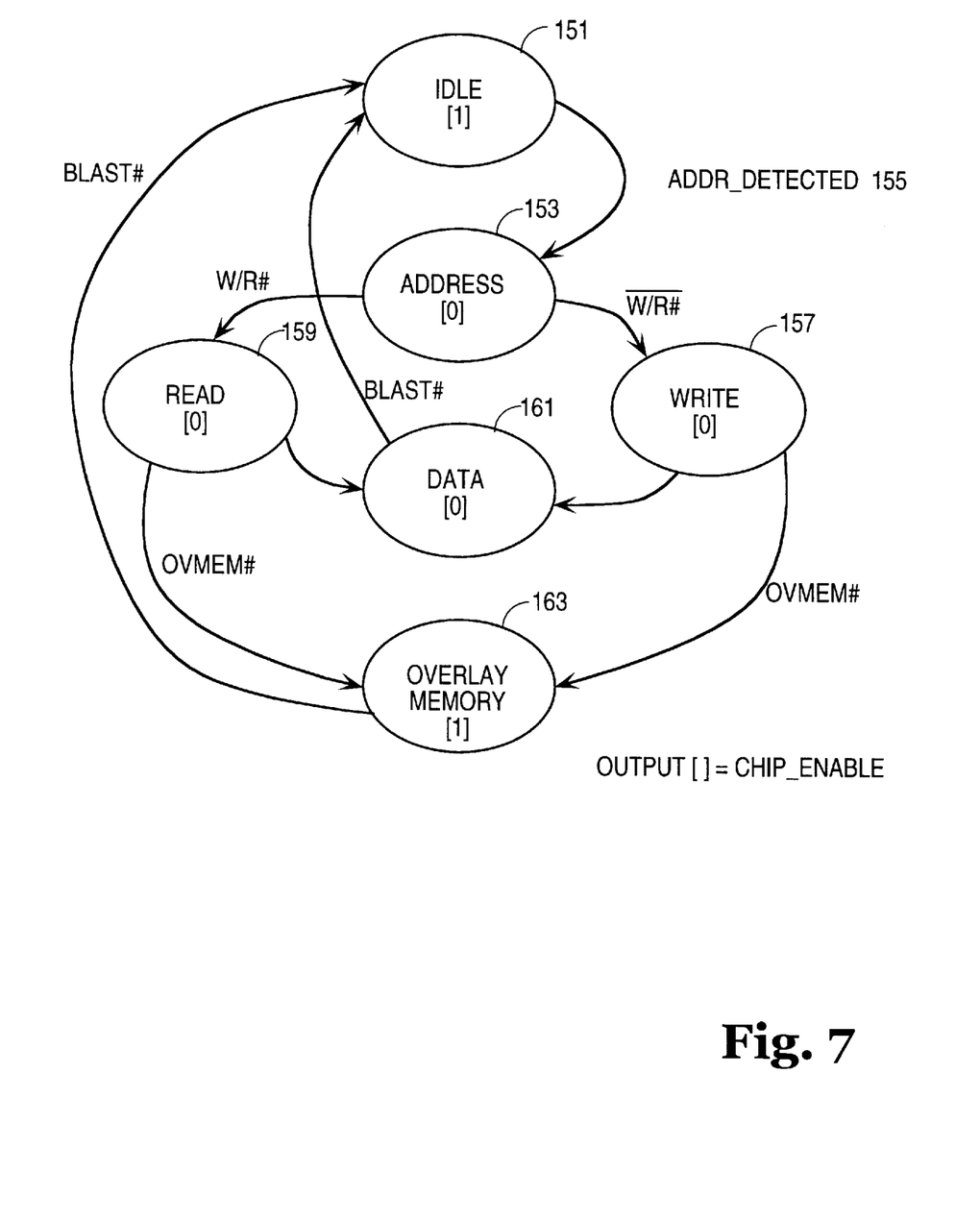
FIG. 7 illustrates a state diagram for the control state machine of FIG. 5.

FIG. 7 illustrates a state diagram for the control state machine 81, as illustrated in FIG. 5. The control state machine 81 is initially in an IDLE state 151. In this state, the chip enable signals (CE#) to memory bank0 and memory bank1 are never asserted. Upon receipt of the ADDR_DETECTED signal 155, the control state machine 81 transitions from the IDLE state 151 to the ADDRESS state 153. In the ADDRESS state, the chip enable signals are always asserted. The control state machine transitions from the ADDRESS state 153 to the WRITE state 157 if a W/R# signal is de-asserted (indicating a write operation). In the WRITE state 157, the chip enable signal is asserted. A MWE# signal is asserted to write data into the selected memory bank. If an asserted W/R# signal is detected, indicating a read operation, the state machine 81 transitions from the ADDRESS state 153 to the READ state 159. In the READ state 159, the chip enable signal corresponding to the selected memory bank is asserted. The MWE# signal is deasserted to read data from memory.

From either the READ state 159 or the WRITE state 157, the control state machine 81 transitions to a DATA state 161 when OVMEM# is deasserted. In this DATA state 161, the chip enable signals are always asserted. In the DATA state 161 at internal WAIT state generator inserts WAIT state space on a value programmed by the respective RDYRCV# signal. The RDYRCVINT# signal is provided to the processor by the memory controller based on the programmed value, which is indicative of the memory access time.

While in the DATA state 161, if a BLAST# signal is detected, the control state machine 81 transitions from the DATA state 161 to the IDLE state 151. From either READ state 159 or the WRITE state 157, the control state machine 81 transitions to an OVERLAY MEMORY State 163 when OVMEM# is asserted. In the OVERLAY MEMORY state 163, the chip enable signals are de-asserted and never asserted. In the OVERLAY MEMORY state 163, the internal wait state generator inserts WAIT states based on an external RDYRCV# signal (i.e., the RDYRCV_OV# signal 103) that is provided by the emulator to the memory controller. In the OVERLAY state 163, the RDYRCVINT# signal is generated in accordance to a value programmed by the RDYRCV_OV# signal 103.

The control state machine 81 stays in the OVERLAY MEMORY state 163 until receipt of the BLAST# signal. Upon receipt of the BLAST# signal, the control state machine 81 transitions from the OVERLAY MEMORY state 163 back into the IDLE state 151.

Figure 8:
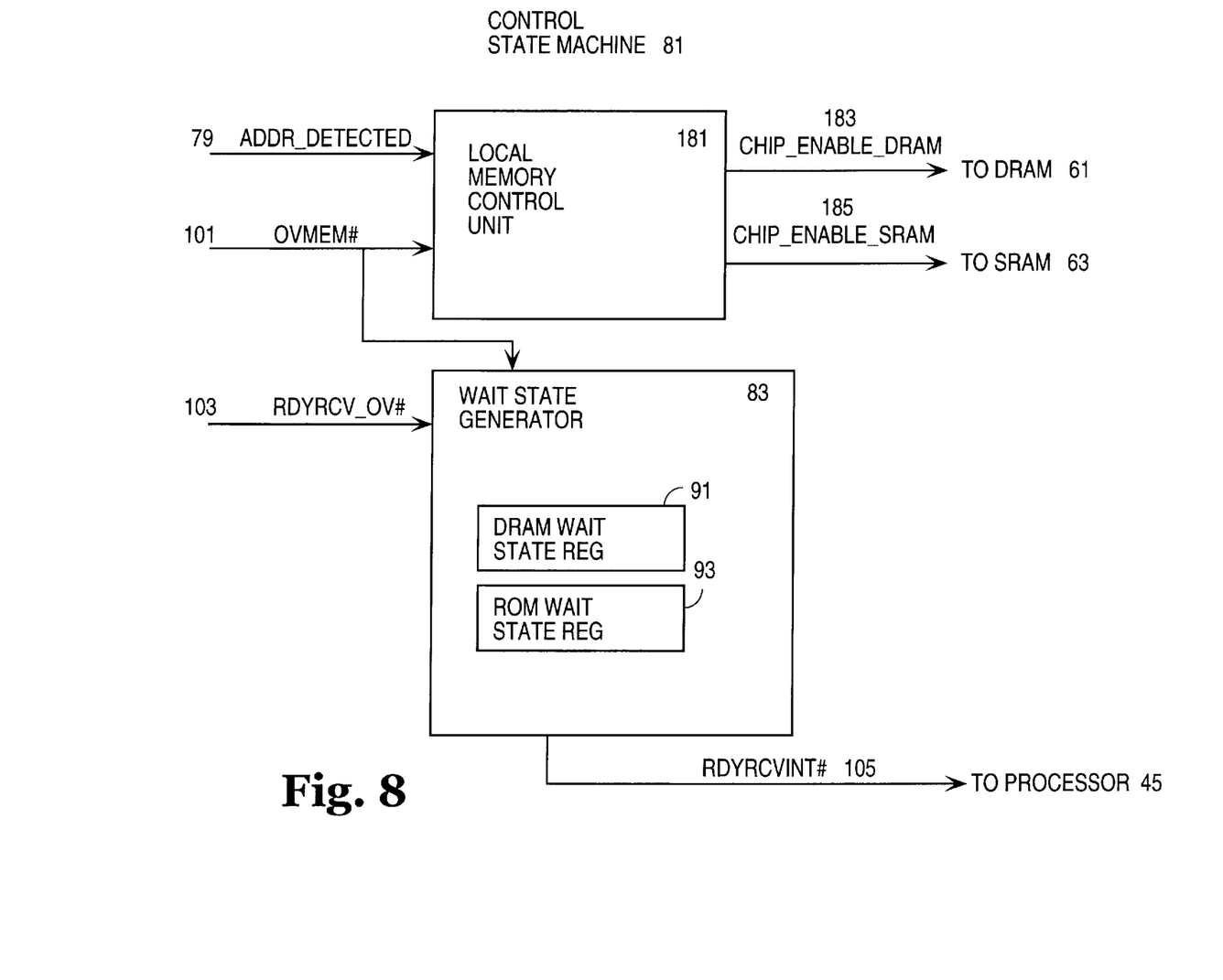
FIG. 8 illustrates in greater detail the control state machine of FIG. 5.
Figure 9:
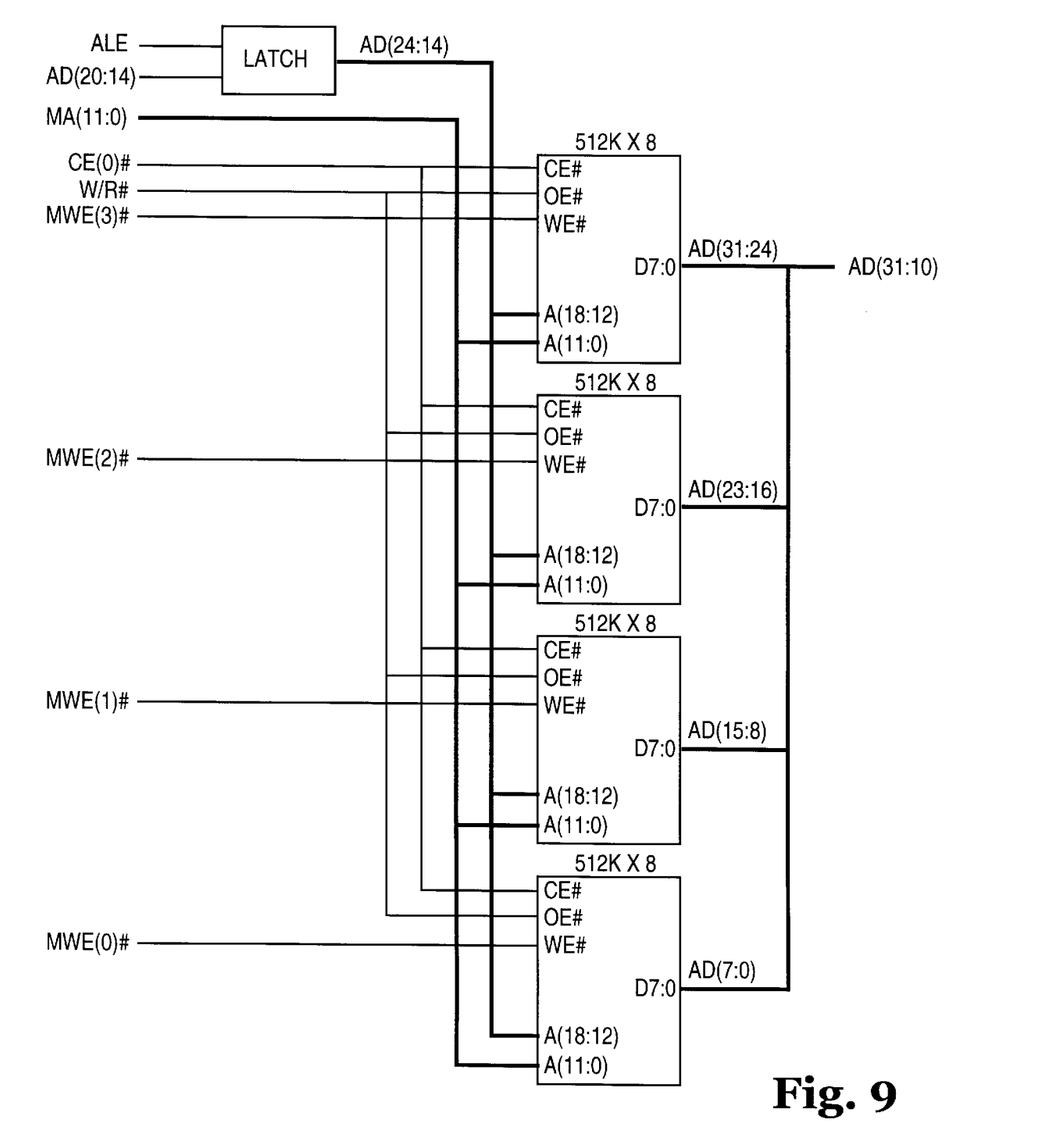
FIG. 9 illustrates an exemplary implementation of a memory bank of FIG. 4.

FIG. 8 illustrates further details of the control state machine 81. The control state machine 81 includes a local memory control unit 181 and the previously described RDYRCVINT# generator 83. The local memory control unit 181 is provided an ADDR_DETECTED signal 79 and the OVMEM# signal 101. The local memory control unit 181 in response to these signals, generates the plurality of control signals to the DRAM and the ROM. These control signals include RAS [3:0]# CAS [7:0]#, DALE [1:0]#, as shown in FIG. 9, hereinafter. Specifically, the local memory control unit 181 generates a CE#_DRAM (chip enable) signal 183 to DRAM 61, a corresponding CE#_ROM signal (chip enable) 185 to ROM 63, a MWE#_DRAM (write/read enable) signal and a MWE#_ROM signal.

The RDYRCVINT# generator 83 is provided the RDYRCV_OV# signal 103, the OVMEM# signal 101, the value from the DRAM Wait State Register 91, and the value from the ROM Wait State Register 93. Depending on which memory bank is enabled (i.e., the overlay memory, the DRAM, or the ROM), the RDYRCVINT# generator 83 generates the RDYRCVINT# signal 105 to the processor 45 using the corresponding RDYRCV_OV# signal 103, the value in the DRAM Wait State Register 91 or the value of the ROM Wait State Register 93.

FIG. 9 illustrates an exemplary implementation of memory bank0 as a 2 megabyte, 32-bit ROM or ROM memory system.

Figure 10:
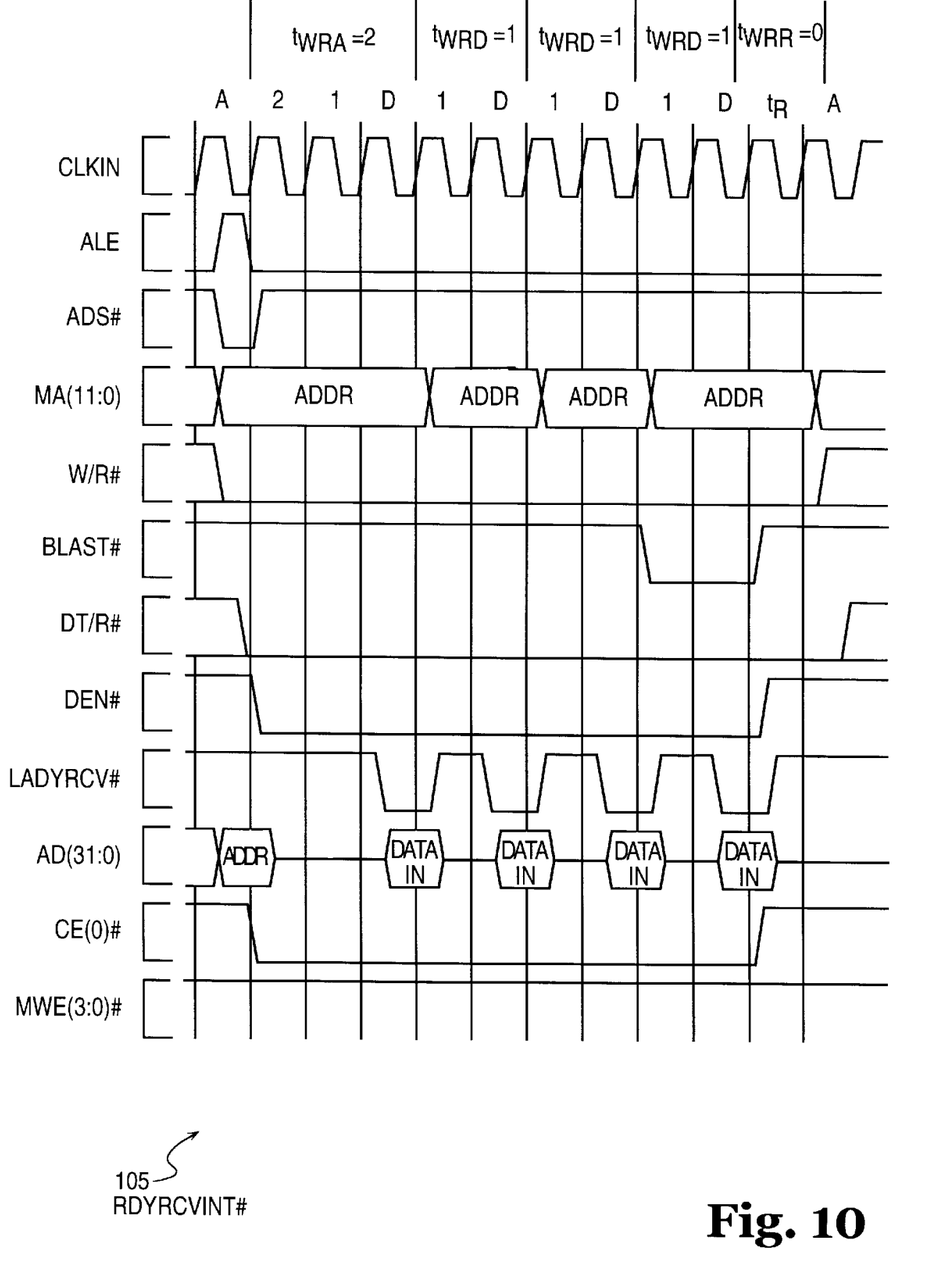
FIG. 10 illustrates a timing diagram of a read access with wait states and also shows how the RDYRCVINT# signal is generated.

FIG. 10 illustrates a timing diagram for a read access with 2,1,1,1 wait states. The RDYRCVINT# signal 105 is illustrated in this timing diagram. The use of an internal wait state generator to adapt to different access times of different types of memories is well known in the prior art.

In summary, the present invention enables the emulator 31 to provide data onto the local processor bus 31 and to provide the local processor 45 with instructions from the overlay memory 35.

First, the emulator 31 provides a signal 101 to the memory controller 59 notifying it that 1) the emulator is connected to the local processor bus 41 with its overlay memory 35 enabled, and 2) to notify the memory controller 59 that an overlay memory address hit has occurred. Once this signal 101 is detected by the memory controller 59, the memory controller 59 disables an internal wait state generator 83. Once the internal wait state generator 83 is disabled, the emulator 31 must assert an external RDYRCV_OV# signal 103 to the memory controller 59 when the valid data is ready to be transferred from the overlay memory 35 to the local processor 45 through the local processor bus 41.

The memory controller 59 also disables the chip select signals corresponding to the local memory banks 61, 63. By disabling the local memory banks 61 and 63, the present invention allows the emulator 31 to drive data onto the local processor bus 41. Consequently, the local processor 45 executes program steps provided by the emulator's overlay memory 35.

A variety of hardware and software functions have been described herein. Depending upon the implementation, many of the hardware functions may be emulated using software. Likewise, software functions may be performed using hardware components having hardwired circuitry configured to perform the functions. In other implementations, some of the hardware or software functions may be configured using firmware or other computer system implementation technologies.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

I claim:

1. The computer system wherein the local memory is a Dynamic Random Access Memory (DRAM).

2. The computer system of claim 1 wherein the local memory is an instruction Read Only Memory (ROM).

3. The computer system of claim 1 wherein the local processor bus is an Intel 80960 processor bus.

4. The computer system of claim 1 wherein the local processor is an Intel 80960 JF processor.

5. The computer system of claim 1 wherein the integrated chip is the Intel 80960 RP chip.

6. A method for providing emulator overlay memory support from an emulator to an integrated ball grid array (BGA) processor package, said integrated ball grid array (BGA) processor package including an integrated chip including a processor having in-circuit emulation capabilities and a memory controller, said integrated ball grid array (BGA) processor package for fixably coupling to a target board, said method comprising the steps of:

a) detecting an emulator overlay memory signal that indicates that the emulator is connected to the processor, that the overlay memory is enabled and that an overlay address hit has occurred;

b) disabling the chip select of the local memory; and c) driving data from the emulator overlay memory to the local processor bus.

7. A computer system having a target board, the computer system comprising:
   a) an emulator for supporting the testing and debugging of a processor, the emulator including an overlay memory for storing data and an emulator probe for transferring data to and from the emulator;
   b) a local memory for storing data;
   c) a ball grid array (BGA) integrated processor package for fixably coupling to the target board, the package having
      i. a processor, the processor having in-circuit emulation capabilities (ICE), and
      ii. a memory controller, coupled to the processor via a local processor bus, for selectively providing data from the local memory and the overlay memory based on a first signal.

8. An integrated ball grid array (BGA) processor package adapted for in-circuit emulation (ICE), the integrated ball grid array (BGA) processor package for fixably coupling to a target board, the package comprising:
   a) a processor bus;
   b) a local memory;
   c) an overlay memory;
   d) a processor having in-circuit emulation (ICE) capabilities; and
   e) a memory controller coupled to the local memory, the overlay memory and the processor via the processor bus, the memory controller for selectively providing data to the processor from the local memory or the overlay memory in response to a first signal.

9. The integrated ball grid array (BGA) microprocessor package of claim 8 wherein the memory controller responsive to said first signal disables the local memory and provides data to the processor from the overlay memory in response to a second signal.

10. The package of claim 8 wherein the local memory is a Dynamic Random Access Memory (DRAM).

11. The package of claim 8 wherein the local memory is an instruction Read Only Memory (ROM).

12. The package of claim 8 wherein the processor bus is an Intel 80960 processor bus.

13. The package of claim 8 wherein the processor is an Intel 80960 JF processor.

14. The package of claim 8 wherein the integrated BGA processor package is the Intel 80960 RP chip.

* * * * *

UNITED STATES PATENT AND TRADEMARK OFFICE
CERTIFICATE OF CORRECTION

PATENT NO. : 5,898,858
DATED : April 27, 1999
INVENTOR(S) : Byron Gillespie

It is certified that error appears in the above-identified patent and that said Letters Patent is hereby corrected as shown below:

In column 5 at line 22 delete "applicationsthat" and
insert --applications that--

Please delete claims 1-14 and insert the claims as follows

1. A computer system having a target board, the computer system comprising:
a)	an emulator for supporting the testing and debugging of a processor, the emulator including an overlay memory for storing data and an emulator probe for transferring data to and from the emulator;
b)	a local memory for storing data;
c)	a ball grid array (BGA) integrated processor package for fixably coupling to the target board, the package having
i.	a processor, the processor having in-circuit emulation capabilities (ICE), and
ii.	a memory controller, coupled to the processor via a local processor bus, for selectively providing data from the local memory and the overlay memory based on a first signal.

UNITED STATES PATENT AND TRADEMARK OFFICE
CERTIFICATE OF CORRECTION

PATENT NO. : 5,898,858
DATED : April 27, 1999
INVENTOR(S) : Byron Gillespie

It is certified that error appears in the above-identified patent and that said Letters Patent is hereby corrected as shown below:

2. The computer system wherein the local memory is a Dynamic Random Access Memory (DRAM).

3. The computer system of claim 1 wherein the local memory is an instruction Read Only Memory (ROM).

4. The computer system of claim 1 wherein the local processor bus is an Intel 80960 processor bus.

5. The computer system of claim 1 wherein the local processor is an Intel 80960 JF processor.

6. The computer system of claim 1 wherein the integrated chip is the Intel 80960 RP chip.

7. A method for providing emulator overlay memory support from an emulator to an integrated ball grid array (BGA) processor package, said integrated ball grid array (BGA) processor package including an integrated chip including a processor having in-circuit emulation capabilities and a memory controller, said integrated ball grid array (BGA) processor package for fixably coupling to a target board, said method comprising the steps of:

a) detecting an emulator overlay memory signal that indicates that the emulator is connected to the processor, that the overlay memory is enabled and that an overlay address hit has occurred;
b) disabling the chip select of the local memory; and
c) driving data from the emulator overlay memory to the local processor bus.

UNITED STATES PATENT AND TRADEMARK OFFICE
CERTIFICATE OF CORRECTION

PATENT NO. : 5,898,858
DATED : April 27, 1999
INVENTOR(S) : Byron Gillespie

It is certified that error appears in the above-identified patent and that said Letters Patent is hereby corrected as shown below:

8. An integrated ball grid array (BGA) processor package adapted for in-circuit emulation (ICE), the integrated ball grid array (BGA) processor package for fixably coupling to a target board, the package comprising:
a) a processor bus;
b) a local memory;
c) an overlay memory;
d) a processor having in-circuit emulation (ICE) capabilities; and
e) a memory controller coupled to the local memory, the overlay memory and the processor via the processor bus, the memory controller for selectively providing data to the processor from the local memory or the overlay memory in response to a first signal.

9. The integrated ball grid array (BGA) microprocessor package of claim 8 wherein the memory controller responsive to said first signal disables the local memory and provides data to the processor from the overlay memory in response to a second signal.

10. The package of claim 8 wherein the local memory is a Dynamic Random Access Memory (DRAM).

UNITED STATES PATENT AND TRADEMARK OFFICE
CERTIFICATE OF CORRECTION

PATENT NO. : 5,898,858
DATED : April 27, 1999
INVENTOR(S) : Byron Gillespie

It is certified that error appears in the above-identified patent and that said Letters Patent is hereby corrected as shown below:

11. The package of claim 8 wherein the local memory is an instruction Read Only Memory (ROM).

12. The package of claim 8 wherein the processor bus is an Intel 80960 processor bus.

13. The package of claim 8 wherein the processor is an Intel 80960 JF processor.

14. The package of claim 8 wherein the integrated BGA processor package is the Intel 80960 RP chip.

Signed and Sealed this

Twenty-first Day of September, 1999

Attest:

Q. TODD DICKINSON

*Attesting Officer*   Acting Commissioner of Patents and Trademarks